United States Patent [19]

Moran

[11] 4,130,089
[45] Dec. 19, 1978

[54] AUTOMATIC AQUARIUM FEEDING DEVICE

[76] Inventor: Daniel J. Moran, Box 5113, 3 W. Henderson St., Wrightsville Beach, N.C. 28480

[21] Appl. No.: 797,033
[22] Filed: May 16, 1977
[51] Int. Cl.² .............................................. A01K 1/10
[52] U.S. Cl. ................................ 119/51 R; 119/51.13
[58] Field of Search ............... 119/51 R, 51.11, 51.13, 119/5

[56] References Cited

U.S. PATENT DOCUMENTS

| | | | |
|---|---|---|---|
| 2,900,022 | 8/1959 | Friedman | 119/51 R X |
| 2,905,144 | 9/1959 | Prigg, Jr. | 119/5 |

*Primary Examiner*—Russell R. Kinsey
*Assistant Examiner*—Daniel J. Leach

[57] ABSTRACT

Food is automatically and periodically dispensed to an aquarium over long periods of time by means of a pivotally mounted arm which has a shallow food containing bowl on one end and which operates directly responsive to evaporation of liquid from a liquid containing cup on the opposite end. A supply of food is placed in the shallow bowl which extends over the surface of the aquarium water. A prescribed volume of water or other liquid having an established rate of evaporation is placed in the liquid containing cup to balance the reciprocating arm by weight. Additional water or liquid in an amount known to evaporate in a given period of time is then added to the liquid already in the cup. As the measured liquid evaporates the food containing bowl will begin to tilt downwardly after an initial period and the food will spill into the aquarium at a preselected time determined by the rate of liquid evaporation. To feed for a period of days, a series of such arms are provided with the liquid cup of each having differing amounts of liquid premeasured to activate the arms after differing time periods.

4 Claims, 2 Drawing Figures

AUTOMATIC AQUARIUM FEEDING DEVICE

BACKGROUND OF THE INVENTION

Aquarium hobbyists have tried many techniques for feeding aquatic animals during periods of absence. The primary approach has been a series of devices which contain a supply of food from which the fish eat at will. The food is not automatically dispensed from these devices into the aquarium and, because of differing dietary habits, the fish may or may not take the food from such an apparatus. Using this type of device is particularly unsuccessful with fish that prefer to eat food after it has settled on the floor of the aquarium.

A second and somewhat more satisfactory approach is disclosed in U.S. Pat. Nos. 2,900,022 to Friedman and 2,905,144 to Prigg. Both of these devices utilize the theory of liquid evaporation as a motivating force to empty food from a container into an aquarium. The patent to Prigg discloses an apparatus which floats on top of the water inside the aquarium and, as normal evaporation of the aquarium water occurs, a series of trays are successively activated at periodic intervals to deposit food into the water. Other than size and difference in operation, one disadvantage to this apparatus is the necessity of floating a part of the apparatus in the aquarium. Water disturbances caused by fish jumping or the malfunction of a filtering system which could alter the rate of evaporation, could cause the float to activate the feed trays at erratic intervals.

The patent to Friedman is a device which includes an activating arm tilted by liquid evaporation from a container attached to the arm. As the liquid evaporates a counterweight causes the arm to rotate slowly into contact with each of a series of tripping arms which are attached individually to feed trays that tilt to pour food into the aquarium. This apparatus is somewhat efficient as long as each mechanism works properly. However, misalignment of the activating arm would cause a malfunction; also should a trip arm malfunction, the activating arm may become stuck at any position and prevent further distribution of food into the aquarium. Because of the number of cooperating elements in the Friedman apparatus, there is considerable likelihood of malfunction while no one is available to correct the problem.

SUMMARY OF THE PRESENT INVENTION

The present invention is a simple, but very effective automatic feeding apparatus for aquariums operated directly by evaporation of water or other liquid having an established rate of evaporation. The device is removably attached to the side of an aquarium at times when the aquarium must be unattended, and because there are no interrelated moving parts there is little opportunity for malfunction and consequent improper feeding.

Basically, the feeder includes a balance arm pivotally attached at a point intermediate the end thereof to a bracket clamped on the side of the aquarium, with the balance arm having a feed cup on one end suspended over the surface of the water in the aquarium and a liquid containing cup attached to the opposite end.

In operation, the food bowl is filled with an amount of food (of any type: flakes, pellets, etc.) equal to one feeding; the liquid cup is filled with water to a level whereby the force on each side of the pivot point is equal and the arm is balanced. Additional water is then added in an amount known to evaporate in a given period of time before feeding is desired. When the second, premeasured amount of water has evaporated the food bowl will begin to tilt downwardly and the food will spill into the aquarium. If more than one automatic feeding is desired additional reciprocating arms are pivotally attached to the aquarium and the water levels incrementally adjusted to cause activation of the arms at preselected intervals, thereby emptying the food bowls at intervals.

For illustrative purposes the evaporative liquid utilized in this disclosure is water. Other liquids with established rates of evaporation may be utilized, although none is as readily available or as inexpensive as water.

Construction materials may vary including any lightweight but rigid plastic, wood, or metal etc., but the preferred material is any of the moldable polymers. The bracket or clamping device is a simple clamping spring mechanism which may be clipped to a side wall of the aquarium.

If a single reciprocating arm is employed for a single feeding it may be attached directly to the bracket by a pivot pin or other pivot means. If a series of arms is necessary, an elongated pivot pin is mounted between two of the upright supports or brackets which are clamped to one side of the aquarium. The reciprocating arms are then mounted in side by side relationship along the pivot pin in such a manner that the food bowls extend over the open top of the aquarium.

When a multiple apparatus is utilized a pivot stop device is placed to the rear of the bracket in a position extending just underneath the liquid containing cups. The pivot stop prevents the downward tilting of the liquid cups past the horizontal when they are filled with liquid which amounts to a weight or force heavier than that of the food bowls. The liquid cups thereby rest on the top surface of the pivot stop until the liquid evaporates to a predetermined level which will activate the downward tilting of the food bowl.

It is therefore an object of the present invention to provide an automatic aquarium feeding device which is gravity activated directly responsive to evaporation of a liquid.

It is another object of the present invention to provide an automatic aquarium feeding device which has relatively few cooperating movable elements, thereby decreasing the chances of malfunction.

It is a further object of the present invention to provide an automatic aquarium feeding device which may be timed to activate at predictable, preselected intervals.

Other objects and advantages of the present invention will become apparent when the following detailed description is studied in conjunction with the attached drawings, of which:

FIG. 1 is a perspective view of the present invention according to a preferred embodiment; and FIG. 2 is a side view of the present invention according to the embodiment shown in FIG. 1.

DETAILED DESCRIPTION OF PREFERRED EMBODIMENT

Figure 1:
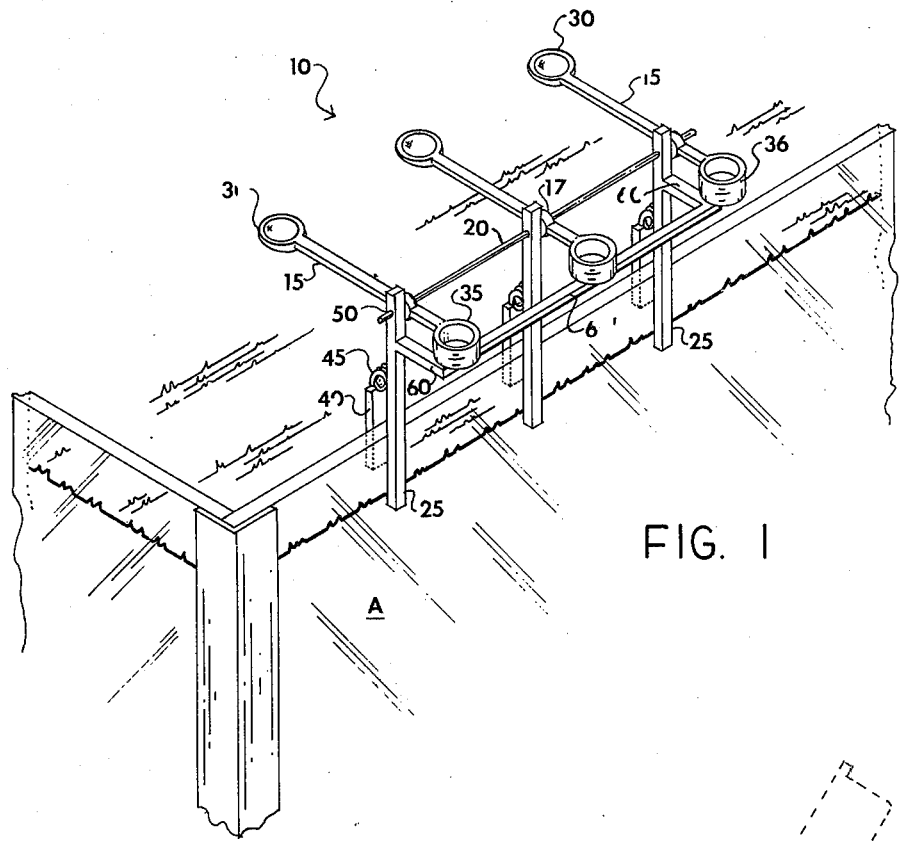

Referring to FIG. 1, the present invention as illustrated is preferably, releasably attached to a side wall of an aquarium A. The feeding apparatus 10 is set up as shown to activate once daily for a three-day period. The apparatus 10 as shown includes three balance arms 15 pivotally attached at an intermediate point (as bearing 17) to an elongated pivot pin 20 extending between two upright supports 25.

Each of the balance arms 15 includes a relatively shallow, food containing bowl 30 which extends out over the surface of the water in aquarium A. On the opposite end of the arm is a liquid containing cup 35 which, as illustrated, preferably has vertical side walls and is somewhat deeper than the food bowl 30 which has sloping side walls so that the food will more easily slide out into the aquarium as it is tilted. Although the liquid cup 35 may be of any configuration, vertical sides make it somewhat easier to establish a rate of evaporation of the liquid being utilized according to prevailing room conditions such as temperatures, humidity, etc.

Figure 2:
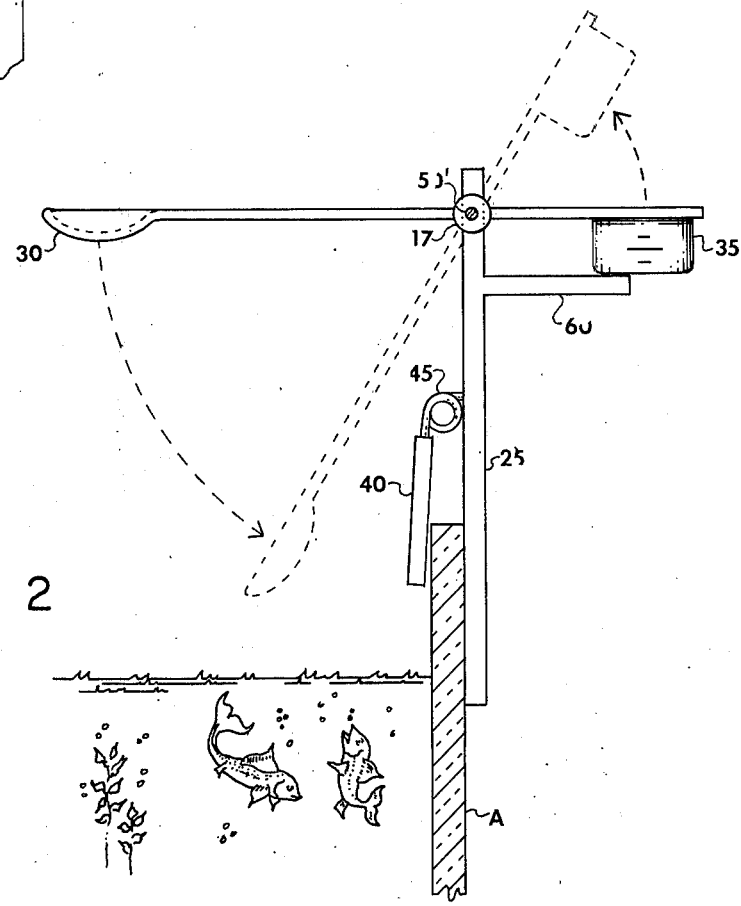

To attach the feeding apparatus 10 to a side wall of aquarium A a spring clip 40 (more clearly illustrated in FIG. 2), attached to a vertical support means or standard 25 by a tension spring 45, is clamped on the aquarium side so that food cup 30 is over the open aquarium. Positioning of the apparatus is a matter of choice primarily dependent on whether other equipment is emplaced on the aquarium. The only essential is that the balance arms 15 be in a position permitting them to activate and dispose the food into the aquarium without interference.

If more than one arm 15 is to be employed two supports 25 may be clipped on the aquarium wall in the manner described above. The required number of arms 15, dependent on number of feedings desired, are mounted on the elongated pivot pin 20 and the pin extended between the two supports by inserting it through an aperture 50 extending through the top of each support. If a single arm is required, for a single feeding, a shorter pivot pin may be inserted through the aperture 50 and through the aperture 50' on the balance arm.

The following describes one way of setting the device up for one or more delayed feedings. After the supports and arms are emplaced on the aquarium wall an amount of food equivalent to one feeding is placed in each food bowl 30. Water is then added to the liquid cups 35 to a level that the force on the liquid cup side of pivot pin 20 is equivalent to the force on the food bowl side. This will establish a balance between the two containers. When the arm is appropriately balanced additional water is added to the cup 35 in an amount known to evaporate during the prescribed period of time before the corresponding food bowl is desired to begin tilting. For instance, if water under given ambient conditions is known to evaporate at the rate of substantially one drop per hour, then after the arm 15 is balanced a drop of water is added for each hour between set up time and the selected feeding time; i.e., if feeding time is 24 hours away, then substantially 24 drops of water are added to the balanced cup. For multiple feedings, water is added to other liquid cups in amounts that will evaporate during selected consecutive periods of time. Alternatively, each liquid cup and food bowl may be provided with graduations 36, indicating approximate amounts for desired intervals. However, room conditions cause considerable variations in evaporation rates, and it is believed the procedure outlined above will provide more satisfactory results.

To prevent the arms from pivoting downwardly when the additional water is added to the cups, a pivot stop 60 extends horizontally behind each support 25 at a level which will engage the undersurface of the liquid cup 35 when the arm 15 is balanced. When multiple arms are utilized a cross bar 60' may be laid across the stops 60 to extend underneath and engage the centrally positioned cup (cups) 35.

Activation of the arm 15 will begin to occur when the measured amount of water in the liquid cup has evaporated. At that time the arm will reach a state of imbalance, the food bowl will tilt downwardly (along the dotted line of FIG. 2), and the food will slide out of the bowl into the aquarium. It should also be mentioned here that, because most fish food is extremely lightweight, the food bowl end of the arm 15 when empty is slightly heavier than the liquid cup to insure the downward tilt of the arm.

As mentioned herein, the apparatus 10 does not include cooperatively dependent elements. Therefore, when the water or other liquid evaporates, gravity alone will naturally cause the food bowl to tilt downwardly and empty the food into the aquarium. There is nothing for the arm 15 to engage or catch on, and nothing to hinder the emptying of the food into the aquarium. One element cannot cause another element to fail and thereby cause improper feeding of the fish or other aquatic animal.

As mentioned hereinabove the feeding apparatus 10 may be made from a variety of materials including lighter weight woods, metals, or preferably plastic. The synthetic polymers are generally preferred because they may be economically molded and are lightweight and rigid, and which do not contain chemicals or other elements which might be harmful to the aquatic animals if placed in the aquarium. As designed, it is not necessary for any of the parts of the apparatus 10 to touch the aquarium water but if this should happen inadvertently the plastics are not likely to cause any damage to the fish or alter the water conditions.

Although a preferred embodiment of the present invention has been disclosed above, it is obvious that further modifications or alterations might be made without departing from the scope of the invention is claimed below.

What is claimed is:

1. An apparatus for automatically and periodically dispensing food to aquatic animals in an aquarium, said apparatus comprising:
    (a) a support means removably attached to a side wall of said aquarium;
    (b) a balance arm having a first end and a second end, said balance arm being pivotally attached to said support means at a point intermediate said first and second end with at least said first end extending over the open top of the aquarium;
    (c) a shallow bowl secured to said first end of said balance arm for holding a supply of food therein;
    (d) a liquid containing cup having an open top and being secured to said second end of said balance arm for containing therewithin a preselected amount of liquid having an established rate of evaporation;
    (e) in operation said first end of said balance arm being activated downwardly by gravity directly responsive to evaporation of said liquid from said second end whereby the food will spill from said bowl into the aquarium at a preselected time determined by the established rate of fluid evaporation.

2. The automatic aquarium feeding apparatus as described in claim 1 further including a pivot stop connected to said support means and positioned immediately beneath said liquid containing cup when in the horizontal position, whereby when said cup is filled with liquid in an amount greater than an amount necessary to balance the weight of food in said bowl, said cup rests on said pivot stop and is prevented from tilting downwardly to spill the liquid therefrom.

3. An automatic aquarium feeding device as described in claim 1 wherein said liquid containing cup further includes vertical side walls.

4. An apparatus for automatically dispensing food to aquatic animals in an aquarium at selected, delayed, time intervals, said apparatus comprising:
   (a) a plurality of spaced, vertical support members removably attached to the upper edge of a side wall of the aquarium;
   (b) a pivot pin extending between said support members;
   (c) a plurality of balance arms, each of which includes a first end and a second end, said balance arms being pivotally attached to said pivot pin intermediate said first and second ends with said first end extending over the open top of the aquarium;
   (d) a shallow bowl secured to said first end of each of said balance arms for holding a supply of food therein;
   (e) a liquid containing cup having an open top, vertical sides, and being secured to said second end of each of said balance arms for containing therewithin a preselected amount of liquid having an established rate of evaporation;
   (f) in operation said first end of each of said balance arms being activated downwardly by gravity directly responsive to evaporation of said liquid from said second end of the corresponding arm, whereby the food will spill from said bowl into the aquarium at several preselected time intervals determined by the established rate of fluid evaporation and the amounts of liquid placed in each cup;
   (g) a pivot stop extending horizontally from the rear of said support means and positioned immediately beneath each of said liquid containing cups when in the horizontal position, whereby when said cups are filled with liquid in an amount greater than the amount necessary to balance the weight of food in each corresponding one of said bowls, said cups rest on said pivot stop and are prevented from tilting downwardly to spill the liquid therefrom.

* * * * *